United States Patent [19]

Thomas

[11] Patent Number: 4,458,933
[45] Date of Patent: Jul. 10, 1984

[54] CYLINDRICAL TANK CARRIER

[75] Inventor: Christian G. Thomas, 1441 NE. 1 Ave., Fort Lauderdale, Fla. 33304

[73] Assignee: Christian Gerhard Thomas, Fort Lauderdale, Fla.

[21] Appl. No.: 435,757

[22] Filed: Oct. 21, 1982

[51] Int. Cl.³ .............................................. B65D 87/00
[52] U.S. Cl. .................................... 294/31.2; 294/137
[58] Field of Search ................ 294/31.2, 15, 137, 146, 294/141, 142, 143, 165, 166, 167, 168, 169; 16/114 R; 215/100 A; 248/76, 79, 83, 89, 313, 316 D; 81/65

[56] References Cited

U.S. PATENT DOCUMENTS 3,817,435 6/1974 DeLuca et al. ................ 294/31.2
4,116,374 9/1978 Garello ........................ 294/31.2

Primary Examiner—James B. Marbert

[57] ABSTRACT

A portable carrier for hand conveyance of cylindrical tanks in a substantially horizontal position, particularly useful for carrying SCUBA compressed air storage tanks. The carrier includes a rigid saddle contoured to mate against a portion of the circumference of the cylindrical tank to be carried, a handle rotatably mounted on the saddle, and a flexible strap for surrounding the remaining portion of the perimeter of the tank. One end of the strap is connected to one end of the saddle and the other end of the strap is wrapped around a portion of the handle such that as the handle is lifted, the strap is tightened against the tank. Length of the strap is adjustable to accommodate different diameter tanks and to provide optional means for rotating and holding the handle against the saddle in a fixed stored position. The carrier is also releasable and quickly removable from the tank.

3 Claims, 7 Drawing Figures

CYLINDRICAL TANK CARRIER

BACKGROUND OF THE INVENTION

This invention relates generally to carrying means, and more particularly to carrying means attached to cylindrical containers. This invention is most useful for hand-carrying compressed air tanks used in SCUBA diving.

Prior art discloses various devices for carrying cylindrical objects such as pressure tanks and fluid containers. U.S. Pat. No. Des. 317,828 discloses a holder for a beverage can which has a fixed-size rigid ring for securing and supporting a container in a generally vertical position only. U.S. Pat. No. 4,116,374 teaches a cylinder carrying strap which provides opposing handles for carrying the cylinder also in a substantially upright position, requiring operation of an over-center release locking buckle to engage or disengage the device to or from the cylinder. A surfboard carrier is disclosed in U.S. Pat. No. 3,591,063 which includes rigid side supports and a securing member for retention against an edge of a surfboard but has no application to a cylindrical object. U.S. Pat. No. 2,967,071 also discloses a handle clamp for cylindrical objects, but is nonadjustable, requires a two-handed operation to attach the device to a cylinder, and includes no provision for folding the handle out of the way when not needed. The device taught in U.S. Pat. No. 2,781,960 has a fixed ring size, is non-foldable, not easily removable, and would not lend itself to conveying heavy cylinders such as compressed gas tanks. The receptacle holder in U.S. Pat. No. 2,685,992 is only a caddy for short containers, such as paint cans, which must be carried in an upright position. No size adjustment is provided. In general, there are presently no teachings which provide a releasably attachable carrying means for heavy cylindrical objects, such as compressed air tanks, which conveniently afford one-handed cylinder carrying mode, increased holding power between handle and cylinder proportional to weight of the cylinder, adjustability for size, and a built-in optional storage mode all included into a very portable unit.

BRIEF DESCRIPTION OF THE INVENTION

A portable carrier for hand conveyance of cylindrical tanks in a substantially horizontal position, particularly useful for carrying SCUBA compressed air storage tanks. The carrier includes a rigid saddle contoured to mate against a portion of the circumference of the cylindrical tank to be carried, a handle rotatably mounted on the saddle, and a flexible strap for surrounding the remaining portion of the perimeter of the tank. One end of the strap is connected to one end of the saddle, and the other end of the strap is wrapped around a portion of the handle such that as the handle is rotated in one direction, effected by lifting, the strap is tightened against the tank. Rotation of the handle in the opposite direction loosens the strap around the cylinder. Length of the strap is adjustable to accommodate different diameter tanks and to provide optional means for rotating and holding the handle against the saddle in a fixed position. The carrier is also releasable and quickly removable from the tank.

It is an object of this invention to provide a portable carrying device for cylindrical objects such as compressed gas cylinders, particularly SCUBA compressed air tanks, which is releasably attachable to the cylinder.

It is another object of this invention to provide a cylinder carrying device which is operably connectable and usable by only one hand.

It is yet another object of this invention to provide the above device for carrying a heavy cylinder in a generally horizontal position, the user's carrying arm extended downward in a most effective carrying position.

It is still another object of this invention to provide a cylinder carrying device which automatically increases its hold on heavier cylinders.

And yet another object of this invention is to provide the above cylinder carrying device with size adjustability.

And a still further object of this invention is to provide the above cylinder carrying device with a handle folding and securing mode when not in use, rather than having to remove the device from the cylinder.

In accordance with these and other objects which will be apparent hereinafter, the instant invention will now be described with particular reference to the accompanying drawings.

PREFERRED EMBODIMENT OF THE INVENTION

Figure 1:
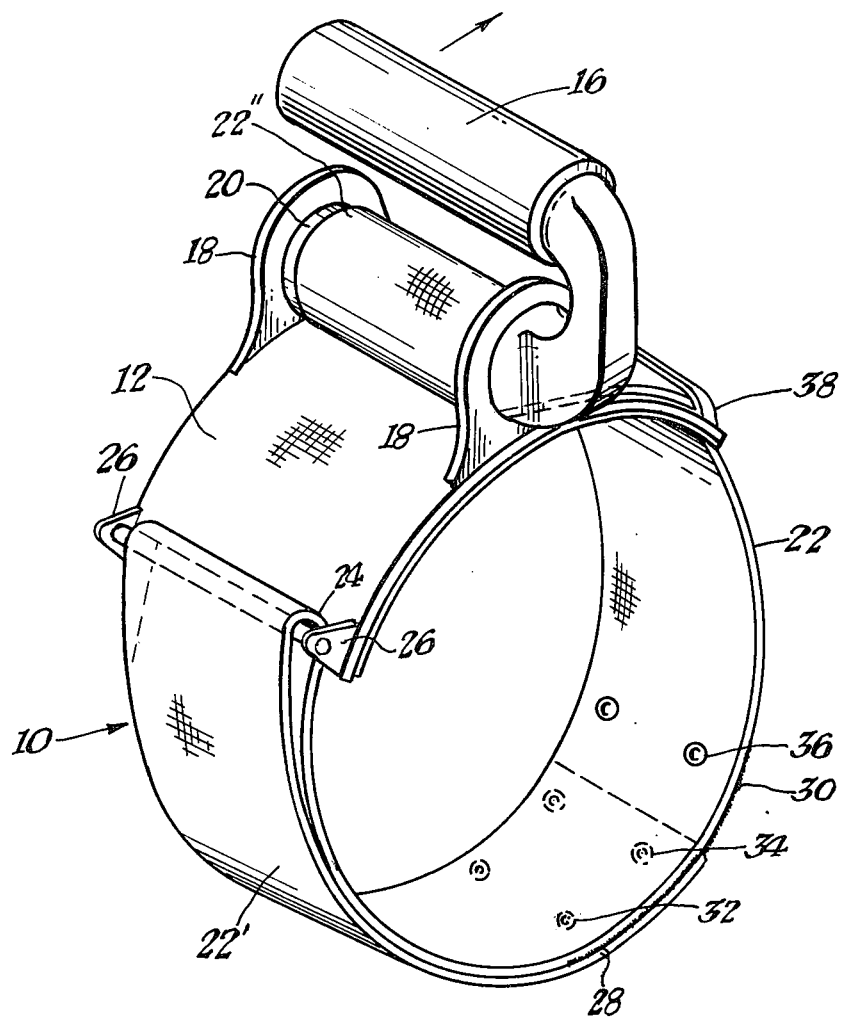
FIG. 1 is a perspective view of the present invention.

Referring now to the drawings and particularly to FIG. 1, the invention is shown generally at 10 and includes a rigid saddle 12 contoured to mate against the side of a circular cylinder around 180 degrees or less of the circumference of the cylinder to allow nonforcible engagement of the saddle to the cylinder. The carrier 10 also includes a handle 16, preferably U-shaped as shown, rotatably mounted on the saddle 12 through ears 18 attached to the saddle. For smooth, effective operation, ears 18 are positioned on the saddle 12 such that the rotational axis of handle portion 20 is parallel to the longitudinal axis of the cylindrical form described by the saddle contour. A length of flexible strap material 22 is also included and is interconnected at one side of the saddle by looping back on itself around roller or pin 24. Pin 24 may be held rigidly or preferably held for rotation in tabs 26 integral to the saddle, the pin 24 providing a non-wearing, smooth surface around which the flexible strap 22 must slide for adjustment. The ends of pin 24 may be headed or cotter pinned (not shown) for retention of the pin 24 in tabs 26. Rubber sheet 14 is adhered to the concave surface of saddle 12 to prevent cylinder marring and to improve grip. The looped end 22' of the strap is attachable back onto a mid-portion of the strap 22 by conventional snap portions 32, 34, or 36, lockably matable to snap portion 40, or by mating VELCRO portions 28 and 30 each attached to the appropriate strap surface, and perferably by both snaps and VELCRO to insure secure engagement.

The other end 22" of the strap is attached around handle portion 20 from between the handle portion 20 and the convex surface of the saddle. This end 22" of the strap is connected to the handle at 20 by mechanical fastener or preferably by adhesive (not shown) and is wrapped round handle portion 20 sufficiently such that when the handle 16 is in its in-use position substantially as shown, at least the very ends of the strap is under the wrap of the strap to reduce the lifting strain on the above-discussed adhesive or mechanical fasteners. As handle 16 is rotated in the direction of the arrow in FIG. 1, more of the strap is drawn through strap guide 38 and wrapped around handle portion 20.

Figure 2:
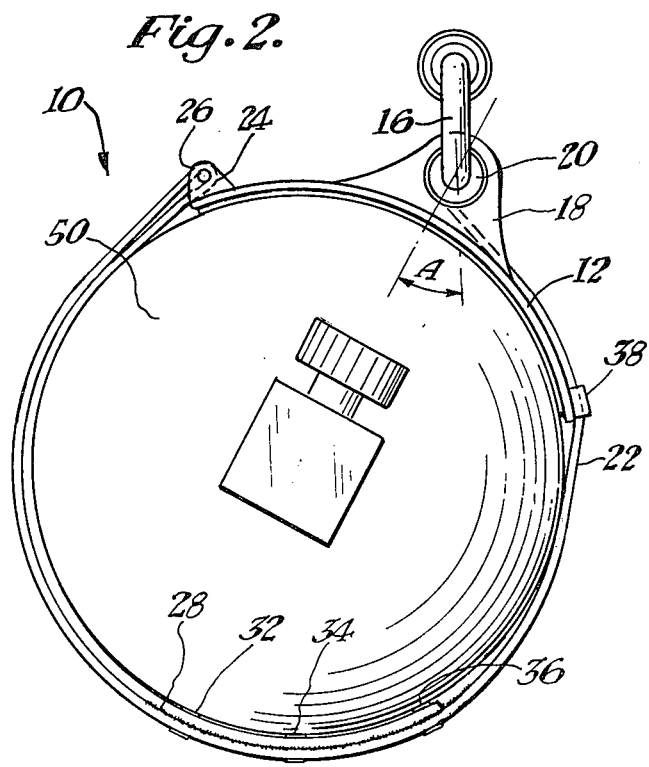
FIG. 2 is an end elevational view of the present invention.
Figure 3:
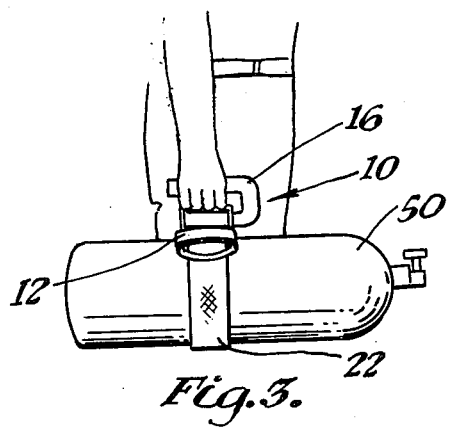
FIG. 3 is a side elevational view of the present invention in use carrying a SCUBA compressed air storage tank.

FIGS. 2 and 3 show the invention in the in-use position, wherein the cylinder or tank 50 is conveyed by the user in a substantially horizontal position with the user able to carry the weight with arm extended downward. The self-locking feature of this invention is best shown in FIG. 2. The position of the snap portions 34 and 40 are positioned on the strap 22 in conjunction with its overall length from handle portion 20 such that, for the particular tank size shown (or for any other) the handle 16 is always at an acute angle A to the centerline common to the tank and handle portion 20. This geometry has the effect of maintaining constant tank-retaining tension on the strap while the user carries the tank 50 held within the carrier 10.

To install the carrier into usable position over the cylinder to be conveyed, the user may simply slide the device, correctly preset for size, over the end of the upright cylinder, rotate the handle 16 in the direction of the arrow in FIG. 1 until the strap tightens fully around the cylinder, and then lift the cylinder by handle 16. Alternately, and without total strap disengagement from around pin 24 in FIGS. 1 and 2, the unsnapped strap may be placed around the cylinder after which the appropriate snaps, based on cylinder size, are engaged. Any misalignment of the VELCRO portions 28 and 30 will be forcefully eliminated when the cylinder is lifted, rotating handle 16 about the axis of handle portion as shown by the arrow in FIG. 1. The VELCRO portions 28 and 30 will then fully re-engage to act as a second fastening means to supplement the holding strength of the snaps.

Figure 4:
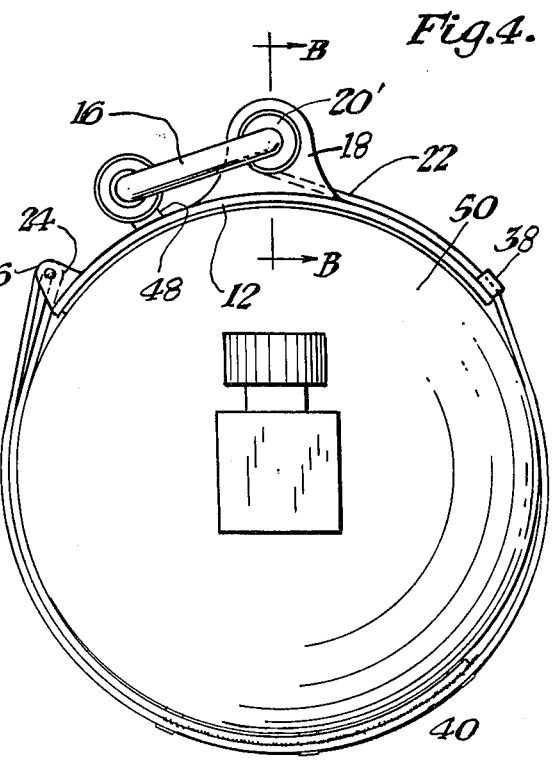
FIG. 4 is an end elevational view of the present invention showing the carrying handle rotated into the storage position.

The storage position for the handle 16 is shown in FIG. 4 with the handle 16 being fully rotated counter-clockwise as viewed against the saddle. To achieve this position, the user simply unsnaps the snap portions, pulls the strap end further around pin 24, and re-engages the appropriate set of snap portions 36 and 40 closer along the strap to handle portion 20. The handle 16 will, of necessity, simultaneously be rotated to the position shown and there firmly held. Although the handle may be rotated directly against the convex surface of the saddle, preferably the handle is rotated against a stop 48 attached to the saddle to provide sufficient hand clearance between handle and saddle to allow the user to grasp the handle in that stored position for short periods of time or in an emergency without the need of repositioning the strap and snaps.

Three sets of snap portions 32, 34 and 36 engagable to snap portions 40 are provided and positioned as shown, although more or less snaps may also be used for the now-described function. Compressed air tanks used in SCUBA diving currently are available in two sizes, 72 and 80 cubic feet capacity tanks. These two sizes are of slightly different diameters and, although one saddle contour will fit both tank sizes, the circumfence of the two tank sizes is sufficiently different to require a different strap length for each. However, the center set of snaps 34 will serve two functions, that for carrying the smaller tank and that for holding the handle in the stored position, as previously discussed, for the larger tank. Snaps 32 are positioned for carrying the larger tank and snaps 36 are positioned for holding the handle in a stored position for the smaller tank.

Figure 5:
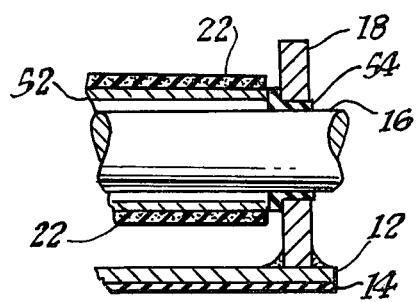
FIG. 5 is a partial sectional view through B—B in FIG. 4 of one embodiment of the handle-to-saddle interconnection.
Figure 6:
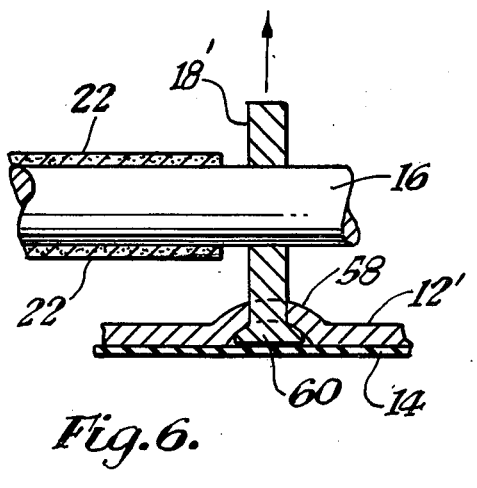
FIG. 6 is a partial sectional view through B—B in FIG. 4 of another embodiment of the handle-to-saddle interconnection.
Figure 7:
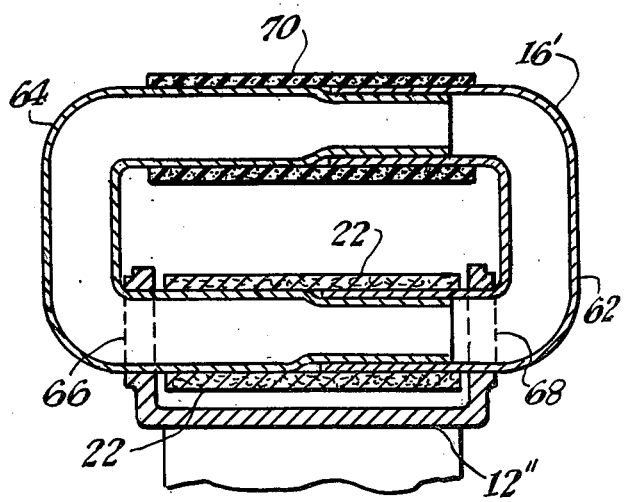
FIG. 7 is a partial sectional view through B—B in FIG. 4 of a third embodiment of the handle-to-saddle interconnection and also showing an alternate handle structure.

FIGS. 5, 6 and 7 show alternate embodiments of handle and saddle construction. FIG. 5 shows ears 18 welded to the saddle 12 with the handle 16 rotating within a plastic bearing 54 and having a spacer sleeve 52 secured over the handle 16. The strap 22 is then secured to the sleeve 52. FIG. 6 shows a weldless means for securing the ears 18' by having a formed slotted socket 58 in the saddle 12' such that the ears may be assembled therethrough in the direction of the arrow up to stops 60 on the lower edge of the ear. Rubber pad 14 adhered to the concave surface of the saddle 12', supported by the cylinder surface, will retain the ears as shown. Lifting force also in the direction of the arrow will only serve to further seat the stops 60 in the pocket 58. FIG. 7 shows an alternate, continuous or O-shaped handle 16' construction of mating tubular handle portions 62 and 64. These handle portions 62 and 64 are assembled into extruded holes in ears 66 and 68 which ears are integral formed portions of the saddle 12", the handle portions 62 and 64 then forceably urged together into the position shown. A resilient tube 70 may be added for hand comfort during assembly.

The instant invention has been shown and described herein in what is considered to be the most practical and preferred embodiment. It is recognized, however, that departures may be made therefrom within the scope of the invention and that obvious modifications may occur to a person skilled in the art.

What I claim is:

1. A portable carrier for elongated, cylindrical containers particularly useful in carrying SCUBA compressed air tanks, said carrier comprising:
  a rigid saddle formed to have a convex and a concave surface matable against a portion of the side surface of the cylindrical container to be carried, said saddle having a first end and a second end;
  a handle having two spaced-apart, interconnected handle portions;
  the first said handle portion held for rotation on a a mid-portion of said convex surface of said saddle;
  the second said handle portion for holding said carrier in the user's hand;
  lateral displacement of said second handle portion causing said rotation of said first handle portion;
  a flexible strap having a first and a second end;
  means for connecting said first end of said strap to said first end of said saddle;
  means for connecting said second end of said strap around said first handle portion;

said strap and said saddle forming a continuous ring into which the cylindrical container cross-section may be inserted such that, when said second handle portion is said laterally displaced in one direction, said strap is tightened around the perimeter of the cylindrical container cross-section, and when said second handle portion is said laterally displaced in the opposite direction, said strap is loosened from around the perimeter of the cylindrical container cross-section allowing said carrier to be removed from around the cylindrical container;

the length of said strap being adjustable to accommodate various sizes of cylindrical containers;

said adjustable strap length also providing means for holding said second handle portion in a stored position against said convex surface of said saddle while said strap is paid tight around the perimeter of the cylindrical container cross-section.

2. A portable carrier as set forth in claim 1, wherein:

said first end of said saddle includes a smooth bar positioned substantially across said first end of said saddle such that said first end of said strap may be looped between said bar and said convex surface of said saddle and around said bar;

said means for connecting said first end of said strap to said first end of said saddle, after said first end of said strap is looped around said bar, includes at least two first snap portions attached apart longitudinally along said strap and a second snap portion attached near said first end of said strap such that said second snap portion and, separately, each said first snap portion are matably and reversibly intergengagable.

3. A portable carrier as set forth in claim 2, wherein:

said means for connecting said first end of said strap to said first end of said saddle, after said first end of said strap is looped around said bar further includes a first VELCRO portion attached along a mid-portion of said strap and a second VELCRO portion attached near said first end of said strap such that said first and said second VELCRO portions are matably and releasably interengagable.

* * * * *